United States Patent [19]
Wasel-Nielen et al.

[11] 3,943,231
[45] Mar. 9, 1976

[54] PROCESS FOR MAKING CONDENSED ALUMINUM PHOSPHATES

[75] Inventors: Horst-Dieter Wasel-Nielen, Hurth-Hermulheim; Gero Heymer, Erftstadt Liblar; Peter Wirtz, Konigstein, Taunus, all of Germany

[73] Assignee: Hoechst Aktiengesellschaft, Frankfurt, Germany

[22] Filed: June 18, 1973

[21] Appl. No.: 370,626

[30] Foreign Application Priority Data
June 21, 1972  Germany............................ 2230175

[52] U.S. Cl. ...................... 423/311; 106/74; 106/84
[51] Int. Cl.² .................... C01B 15/16; C01B 25/26
[58] Field of Search ........................... 423/308–313; 106/74, 84

[56] References Cited
UNITED STATES PATENTS

| | | | |
|---|---|---|---|
| 2,898,189 | 8/1959 | Rodis.................................. | 423/315 |
| 3,445,257 | 5/1969 | Hloch et al. ........................... | 106/84 |
| 3,607,019 | 9/1971 | Herink................................ | 423/312 |

FOREIGN PATENTS OR APPLICATIONS

| | | | |
|---|---|---|---|
| 504,832 | 8/1954 | Canada................................ | 423/309 |
| 995,096 | 6/1965 | United Kingdom................. | 423/311 |
| 1,467,061 | 4/1969 | Germany............................. | 423/308 |
| 1,767,460 | 9/1971 | Germany | |

*Primary Examiner*—Herbert T. Carter
*Assistant Examiner*—Gregory A. Heller
*Attorney, Agent, or Firm*—Connolly and Hutz

[57] ABSTRACT

The invention provides condensed aluminum phosphates which contain $P_2O_5$ and $Al_2O_3$ in a molar ratio equal to or greater than 1.5:1, are X-ray amorphous and have an apparent density between 50 and 200 grams/liter.

They are made by spray-drying an aluminum orthophosphate solution or suspension containing $P_2O_5$ and $Al_2O_3$ in the molar ratio desired in the final product, in a spray tower at temperatures higher than a 250°C to effect direct transformation into condensed aluminum phosphates.

4 Claims, No Drawings

PROCESS FOR MAKING CONDENSED ALUMINUM PHOSPHATES

The present invention provides condensed aluminum phosphates which contain $P_2O_5$ and $Al_2O_3$ in a molar ratio equal to, or greater than, 1.5:1, preferably 2-3:1, and partially have novel physical properties, a process for making them and their uses.

Crystalline condensed aluminum phosphates have already been described in the literature. In Bull.Soc.-Chim. France 1962, pages 1237 et seq., F. D'Yvoire has identified an aluminum tetrametaphosphate which has the formula $Al(PO_3)_3$ and a cyclic anion A, and four long-chain polyphosphates which equally have the formula $Al(PO_3)_3$ (B, C, D, E), along their specific X-ray spectrums. As described by D'Yvoire, it is necessary for these known condensed phosphates to be produced with the use of $P_2O_5$ and $Al_2O_3$ in a molar ratio of 4-15:1. In other words, it is necessary for the starting solution to contain a considerable excess of $P_2O_5$. In addition to this, it is necessary for the reaction to be carried out over prolonged periods comprising several hours, which make D'Yvoire's process unattractive for commercial production of condensed aluminum phosphates.

German published Specification "Offenlegungsschrift" 1 767 460 describes a process for making condensed aluminum phosphates, wherein soluble, linear or cyclic condensed alkali metal polyphosphates are reacted with soluble aluminum salts in water and the resulting condensed aluminum phosphates are filtered off, washed, dried and annealed at temperatures between 300° and 600°C. An adverse effect of this known process resides in the use of relatively costly starting materials, such as aluminum sulfate, aluminum nitrate or potassium-aluminum alum, and condensed sodium phosphates, such as tetrasodium diphosphate, sodium trimetaphosphate, sodium hexametaphosphate or tetrasodium tetraphosphate. In this process it is also necessary for the resulting precipitated matter to be dried over prolonged periods (substantially 24 hours) and for the dry product to be annealed for several hours.

It is also known that it is possible for the longchain $Al(PO_3)_3$ B-modification to be selected from known condensed aluminum phosphates for use as a hardener in water-glass cements, whereas the $Al(PO_3)_3$ A-modification cannot be used to this effect, as it completely lacks hardener properties.

German Pat. No. 1,252,835 describes the use of condensed aluminum phosphates as hardeners in water-glass cements, the condensed aluminum phosphates being produced by evaporating aluminum phosphate solutions to dryness and by subjecting the resulting aluminum orthophosphates to a two-step heat treatment at different temperatures.

This is a very costly procedure as it is necessary for the orthophosphates initially produced to be subjected, during the two-step heat treatment, to a heating programme which is selected within very narrow limits and which must be accurately adhered to. Failing this, qualitatively strongly different final products are obtained, even in those cases in which the parameters defining the heating programme are found to merely slightly deviate from optimum values. Heating, whenever it occurs even at slightly increased rates during the first annealing step, has more particularly been found to almost exclusively effect the formation of the $Al(PO_3)_3$ A-modification rather than the formation of the targeted $Al(PO_3)_3$ B-modification. The critical temperature, which depends on the composition of the aluminum orthophosphate used, can be identified by thermogravimetric or differential-thermoanalytic methods only, whereby the process is rendered even more complicated. In addition to this, the condensed phosphates are obtained in the form of very coarse material which must be crushed and/or ground.

It is accordingly an object of the present invention to provide a very simple and continuous process permitting condensed aluminum phosphates to be produced for various uses from inexpensive starting material, such as aluminum hydroxide and phosphoric acid.

The process of the present invention comprises more particularly spray-drying an aluminum orthophosphate solution or suspension containing $P_2O_5$ and $Al_2O_3$ in the molar ratio desired in the final product, in a spray tower at temperatures higher than 250°C to effect direct transformation into condensed aluminum phosphates. To produce X-ray amorphous condensed aluminum phosphates having an apparent density between 50 and 200 g/l, it is necessary for the solution or suspension to be sprayed through a flame at tower temperatures between 250° and 700°C and at off-gas temperatures between 100° and 500°C. In all other cases, the solutions or suspensions are spray-dried with the use of hot gas having a temperature between 250° and 700°C.

In those cases in which the condensed aluminum phosphates are programmed for use as quick-setting hardeners in water-glass cements, the solutions or suspensions should be spray-dried at temperatures between 300° and 400°C, and in those cases in which they are programmed for use as slow-setting hardeners in water-glass cements, the solutions or suspensions should be spray-dried at temperatures between 400° and 600°C.

Hardeners for use in water-glass cements (these are aluminum phosphates which effect setting within a predetermined time) are obtained by spray-drying the solutions or suspensions at temperatures between 300° and 400°C and by annealing the resulting spray-dried product. Condensed aluminum phosphates which cause setting of the above cements within 10 to 50 min. are obtained by annealing the spray-dried product for a period between 10 and 60 min. at temperatures between 400° and 600°C, the annealing temperature being the higher the longer the setting time targeted within the limits specified, and the annealing time being the shorter the shorter the setting time targeted within the limits specified.

The condensed aluminum phosphates of the present invention are very well adapted for use in known water-glass cements. This is a very unexpected result in view of German Pat. No. 1,252,835, teaching that rapid heating of aluminum orthophosphate solutions (i.e. condensation which avoids the formation of solid aluminum orthophosphate as an intermediary product and also avoids the first annealing step) results in products which cannot be used as hardeners. The aluminum phosphate solutions or suspension can be prepared in known manner by reacting aluminum hydroxide with phosphoric acid, which are used in proportions corresponding to the $P_2O_5:Al_2O_3$ ratio desired to be established in the final product.

In carrying out the process of the present invention it is not necessary to use a specific type of spray tower. Use can more particularly be made of facilities, inside which the solution is sprayed through a flame ring or cone produced with gas burners, for example. It is also possible for the hot gases to be produced in combustion chambers outside the tower and to be contacted with sprayed material flowing co-or countercurrently thereto. The degree of condensation of the final products is easy to determine by identifying the loss on ignition within 2 hours at 600°C, this making expensive chain length analysis unnecessary.

The products of the present invention comprise products partially unknown heretofore. The prior art condensed aluminum phosphates are crystalline and have an apparent density between substantially 800 and 1000 g/l, whereas the products of the present invention, namely those which are produced by spray-drying through a flame zone, are X-ray amorphous substances which have an apparent density between 50 and 200 g/l.

The present invention is the first to provide a continuous technically inexpensive process for making condensed aluminum phosphates in good space/time-yields, which is highly advantageous. In addition to this, the present process is very flexible and permits the manufacture of products for special uses. In the production of hardeners for water-glass cements, for example, it is possible for the setting time of the cements to be varied within wide limits by varying the conditions selected in making the aluminum phosphate hardeners. A further advantage resides in the fact that it is not necessary for the products of the present invention to be post-annealed. It is also possible, however, for the condensation to be effected inside the spray tower at relatively low temperatures and for the resulting product to be subjected to continuous thermal after-treatment, for example in a rotary tube. A still further advantage resides in the fact that the products of the present invention are obtained in the form of particles fine enough for many uses, making grinding unnecessary. The products of the present invention find use as hardeners and recommend themselves for further use as fillers or thickeners, thanks to their extremely low apparent density.

The follow Examples illustrate the invention.

EXAMPLE 1

480 Kg of phosphoric acid which contained 78.5 weight % of $H_3PO_4$ were introduced into a jacketed agitator vessel and heated therein to 80°C by means of steam. A suspension of 100 kg of aluminum hydroxide in 100 kg of water was added with agitation and at a rate such that the temperature of 80°C was substantially retained. The resulting clear aluminum phosphate solution contained $Al_2O_3$ and $P_2O_5$ in the molar ratio of 1:3.

80 L/hr of the aluminum phosphate solution so made were sprayed equidirectionally through a flame ring produced by means of gas burners. The gas temperature inside the tower was between 400° and 470°C and the outgoing air had a temperature of 350°C. 70 kg/hr of condensed aluminum phosphate were removed. It was X-ray amorphous and underwent a 3.9 weight % loss on ignition after 2 hours at 600°C. This corresponded to a degree of condensation of about 5.

Sieve analysis of the product indicated the following particle size distribution:

| | |
|---|---|
| > 500 microns | 1.6 weight % |
| > 400 microns | 2.6 weight % |
| > 300 microns | 6.7 weight % |
| > 200 microns | 15.9 weight % |
| > 100 microns | 40.5 weight % |
| < 100 microns | 59.5 weight % |

The apparent density was 145 g/l.

The unannealed product so made was tested as to its qualification for use as a hardener in water-glass cements. To this end, it was added to cement which contained 68.9 parts of quartz powder, 28.3 parts of potassium water-glass ($K_2O:SiO_2 = 1:1.88$) and 2.8 parts of condensed aluminum phosphate.

The results obtained and the requirements which an acidproof cement has to meet are indicated in the following:

| | Values required | Result obtained |
|---|---|---|
| Setting time | 50 – 70 min. | 50 min. |
| Shore hardness D[+)] after 24 hours | > 20 | 50 |
| Waterproof after storage in open air for | < 14 days | 8 days |

The product, which was not subjected to thermal aftertreatment, was found to be a very good hardener for acidproof cements.

In the above Example and in the following Examples, the Shore hardness was determined after 24 hours in accordance with DIN-specification (DIN = German Industrial Standard) and ASTM-specification D 1484, respectively.

EXAMPLE 2

A suspension of 100 kg of aluminum hydroxide in 100 kg of water was added, in the manner described in Example 1, to 400 kg of phosphoric acid which contained 78.5 % of $H_3PO_4$. The resulting solution contained $Al_2O_3$ and $P_2O_5$ in the molar ratio of 1:2.5 and was sprayed at a rate of 135 l/hr through a flame ring. The following temperature conditions were established: 380°C in the tower head, 390°C in the tower base and 160°C for the outgoing air. 110 Kg/hr of condensed phosphate were removed from the tower. The phosphate had an apparent density of 160 g/l and underwent a 6.4 weight % loss on ignition after 2 hours at 600°C. This corresponded to a degree of condensation of about 3. A water-glass cement, in which the product so made was the hardener (68.9 parts of quartz powder, 28.3 parts of water-glass, 2.8 parts of hardener) was found to have a setting time comprising a few minutes. The condensed aluminum phosphate so made was annealed, whereby it was possible for the setting time of the water-glass cement to be varied within wide limits. This and the test results on hardness and waterproofness are indicated in the following Table:

| Annealing conditions | | Setting time min. | Shore hardness D after 24 hours | Waterproofness after |
|---|---|---|---|---|
| Time min. | temperature °C | | | |
| 0 | — | 7 | unidentified | unidentified |
| 15 | 500 | 30 | 75 | 8 days |
| 30 | 500 | 45 | 70 | 8 days |
| 60 | 500 | 60 | 55 | 8 days |

EXAMPLE 3

20 L/hr of the aluminum phosphate solution in Example 2 were sprayed in a tower. The spray inducing means was air which came from a combustion zone and which was introduced into the tower equidirectionally with the solution. The hot air entered the tower at a temperature of 330°C and left the tower at a temperature of 215°C. The spray product, which was continuously removed from the tower, underwent a 10.5 weight % loss on ignition after 2 hours at 600°C (this corresponded to a degree of condensation of about 2) and an apparent density of 840 g/l. The product so made was postannealed for 1 hour at 500°C and condensed aluminum phosphate which had very good hardener properties was obtained.

EXAMPLE 4

The aluminum phosphate solution of Example 2 was sprayed at a rate of 80 l/hr through a flame ring. The temperature was 490°C in the tower head, 510°C in the tower base and 410°C for the outgoing air. About 70 kg/hr of condensed phosphate were obtained which underwent a 1.4 weight % loss on ignition after 2 hours at 600°C (this corresponded to a degree of condensation of about 14). Sieve analysis indicated the following particle size distribution:

| | |
|---|---|
| > 500 microns | 1.1 weight % |
| > 400 microns | 6.8 weight % |
| > 300 microns | 18.9 weight % |
| > 200 microns | 43.5 weight % |
| > 100 microns | 76.2 weight % |
| < 100 microns | 23.8 weight % |

The apparent density was 67 g/l.

The following very good results were obtained for an acidproof cement which contained the above unannealed product as the hardener.

| | |
|---|---|
| Setting time | 55 min. |
| Shore hardness D after 24 hours | 65 |
| Waterproof after | 10 days. |

We claim:

1. A process for spray-drying solutions or suspensions of aluminium orthophosphates containing $P_2O_5$ and $Al_2O_3$ in a molar ratio equal to or greater than 1.5:1 in a spraying tower at elevated temperatures which comprises spraying the said solutions or suspensions through a flame zone, the temperatures within the said spraying tower being between 300° and 600°C and off-gases escaping from the said tower having temperatures between 100° and 500°C with the resultant formation of condensed aluminium phosphates containing $P_2O_5$ and $Al_2O_3$ in a molar ratio equal to or greater than 1.5:1, being X-ray amorphous and having an apparent density between 50 and 200 grams/liter.

2. The process as claimed in claim 1, which comprises producing quick-setting condensed aluminium phosphate hardeners for water-glass cements by spray-drying the said solutions or suspensions at temperatures between 300° and 400°C.

3. The process as claimed in claim 1, which comprises producing slow-setting condensed aluminium phosphate hardeners for water-glass cements by spray-drying the said solutions for suspensions at temperatures between 400° and 600°C.

4. The process as claimed in claim 1, which comprises producing condensed aluminium phosphate hardeners for water-glass cements, which cause setting of the cements within a period of 10 to 50 minutes, by spray-drying the said solutions or suspensions at temperatures between 300° and 400°C and annealing the resulting spray-dried product for a period between 10 and 60 minutes at temperatures between 400° and 600°C, the annealing temperature being the higher within the limits specified the longer the setting time targeted within the limits specified, and the annealing time being the shorter within the limits specified the shorter the setting time targeted within the limits specified.

* * * * *